(12) United States Patent
Katayama

(10) Patent No.: US 6,226,034 B1
(45) Date of Patent: *May 1, 2001

(54) SPATIAL NON-UNIFORMITY CORRECTION OF A COLOR SENSOR

(75) Inventor: Andrew S. Katayama, Cardiff, CA (US)

(73) Assignee: Roper Scientificomasd, Inc., San Diego, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/851,653

(22) Filed: May 6, 1997

(51) Int. Cl.[7] ................ H04N 9/64; H04N 3/14
(52) U.S. Cl. ............ 348/242; 348/273; 348/246
(58) Field of Search ............... 348/242, 272, 348/273, 253, 241, 246, 247, 250

(56) References Cited

U.S. PATENT DOCUMENTS

| | | | |
|---|---|---|---|
| 4,298,887 | * 11/1981 | Rode | 358/113 |
| 4,757,385 | * 7/1988 | Hieda | 358/213.22 |
| 5,333,055 | * 7/1994 | Murata et al. | 348/242 |
| 5,521,837 | * 5/1996 | Frankle et al. | 364/491 |
| 5,585,945 | * 12/1996 | Ikeda et al. | 358/540 |
| 5,850,472 | * 12/1998 | Alston et al. | 382/162 |
| 5,874,994 | * 2/1999 | Xie et al. | 348/349 |

* cited by examiner

*Primary Examiner*—Wendy Garber
*Assistant Examiner*—Jacqueline Wilson
(74) *Attorney, Agent, or Firm*—Ohlandt, Greeley, Ruggiero & Perle

(57) ABSTRACT

A color imaging system comprising a color image sensor having a matrix of photosites and a color filter array (CFA) masking the matrix of photosites, such that each photosite captures one color of first, second, and third colors, the CFA constituting a repetitive pattern of the first, second and third colors, the sensor producing a color image signal including a matrix of monocolor pixels corresponding to the color filter array pattern; and a field programmable gate array which is programmed as a spatial non-uniformity color corrector for correcting each of the monocolor pixels of the color image signal by a simplified quadratic function along each image axis.

1 Claim, 5 Drawing Sheets

SPATIAL NON-UNIFORMITY CORRECTION OF A COLOR SENSOR

FIELD OF THE INVENTION

This invention relates in general to image processing and relates more particularly to the correction of spatial non-uniformities of an image produced by a color image sensor.

BACKGROUND OF THE INVENTION

The need for uniformity correction to correct for hue shifts in a single color-filter-array (CFA) image sensor has been recognized. Such sensors uses a regular pattern of colored dyes directly over the pixel sites in order to capture one color component per pixel. One particular pattern used in a digital still camera consists of a regular 2×2 pixel array of kernels. Each kernel consists of two green pixels on one diagonal, and one each of a red and blue pixel on the other diagonal. In order to reconstruct a full RGB (red, green, blue) image, processing is required to reconstruct the missing color information at each pixel site.

The sources of the non-uniformities is due to at least two mechanisms: non-uniformities in the poly-oxide sensor layer, resulting in a spatially varying spectral response, and the non-uniform application of the dyes when they are spun onto the die. The behavior of these non-uniformities is such that they are slowly varying. It has been found that a quadratic model provides an accurate enough of a fit to the actual non-uniformity profile.

When the digital image from a CFA digital camera is transferred to a computer, all spatial and colorimetric processing is done by software on the host computer, as the application does not demand real-time processing. Included in this processing is an algorithm to correct the red and blue color planes for non-uniformities. As these corrections are performed in software by the host computer, multiplications are left in the implementation of the algorithm.

There is a need to correct spatial non-uniformities in a video rate (as opposed to still-frame) color imager, where we wish to process the color information in real-time to be able to support a live color display output. Thus, the processing needs to be performed in real-time. It is therefore essential in such an application to reduce the costs of the implementation such that they can be implemented economically in off-the-shelf components.

SUMMARY OF THE INVENTION

According to the present invention, there is provided a solution to the needs discussed above.

According to an aspect of the present invention, there is provided a color imaging system comprising a color image sensor having a matrix of photosites and a color filter array (CFA) masking the matrix of photosites, such that each photosite captures one color of first, second, and third colors, the CFA constituting a repetitive pattern of the first, second and third colors, the sensor producing a color image signal including a matrix of monocolor pixels corresponding to the color filter array pattern; and a field programmable gate array which is programmed as a spatial non-uniformity color corrector for correcting each of the monocolor pixels of the color image signal by a simplified quadratic function along each image axis.

ADVANTAGEOUS EFFECT OF THE INVENTION

The present invention has the following advantages:
1. Correction of spatial non-uniformities in a CFA color image sensor is done in real time at video rates to support a live color display output.
2. The correction technique is implemented economically in off-the-shelf components.

DETAILED DESCRIPTION OF THE INVENTION

Figure 1:
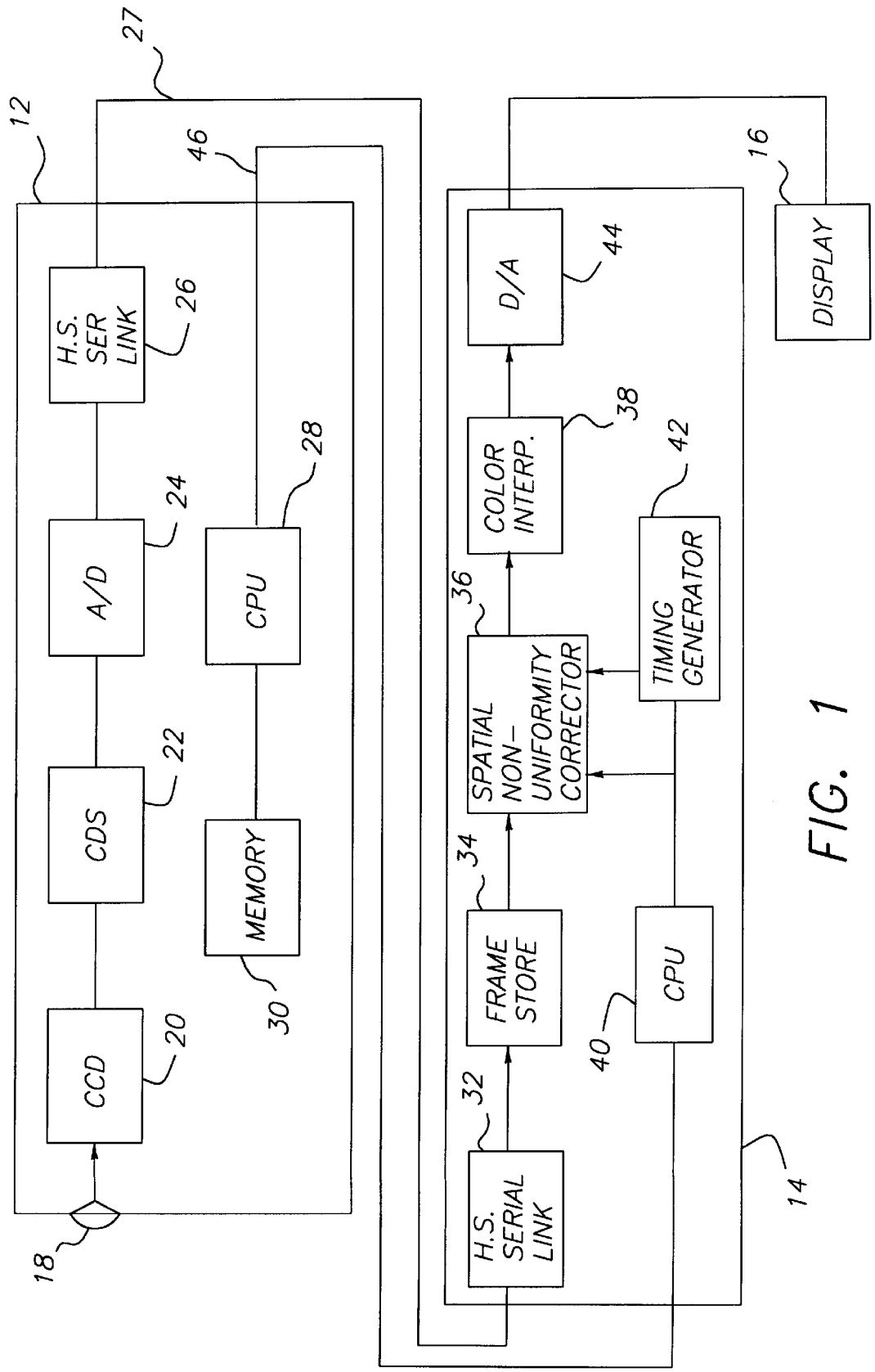
FIG. 1 is a block diagram of a color image system incorporating the present invention.

Referring now to FIG. 1, there is shown a color imaging system incorporating the present invention. As shown, the color imaging system includes a color video camera 12, color image processor 14, and color image display 16. Color video camera 12 includes a lens 18, CCD color image sensor 20, correlated double sampling (CDS) circuit 22, analog-to-digital converter (A/D) 24, high speed serial link driver 26, central processing unit (CPU) 28 and memory 30. Color image processor 14 includes high speed serial link driver 32 (linked to driver 26 by high speed link 27), frame store 34, non-uniformity corrector 36, color interpolator 38, CPU 40, timing generator 42, and digital-to-analog converter (D/A) 44. Display 16 can be any type of video display, such as CRT, LCD, plasma.

The color imaging system operates as follows. A scene to be captured is projected on sensor 20 by lens 18. Sensor 20 produces an analog video signal which is noise corrected by CDS circuit 22. A/D 24 converts the analog video signal to a digital video signal which is transmitted to processor 14 by high speed link 26. Memory 30 stores spatial non-uniformity correction data unique to sensor 20 which is used in the spatial non-uniformity correction technique of the present invention. Camera CPU 28 transmits this data to processor CPU 40 over a serial link 46.

Color image processor 14 receives the digital image data by means of link 27 and stores it in frame store 34. According to the present invention, the digital image data is corrected for spatial non-uniformities by a correction algorithm implemented in a field-programmable gate array which includes corrector 36. Corrector 36 includes three correctors, one for each color R,G,B. After spatial non-uniformity correction, each monocolor pixel is color interpolated by color interpolator 38 to produce an RGB tri-color pixel. The digital color image is converted by D/A 44 to an analog color image which is displayed on display 16. CPU 40 and timing generator 42 provide correction coefficient data and timing signals to corrector 36.

Figure 2:
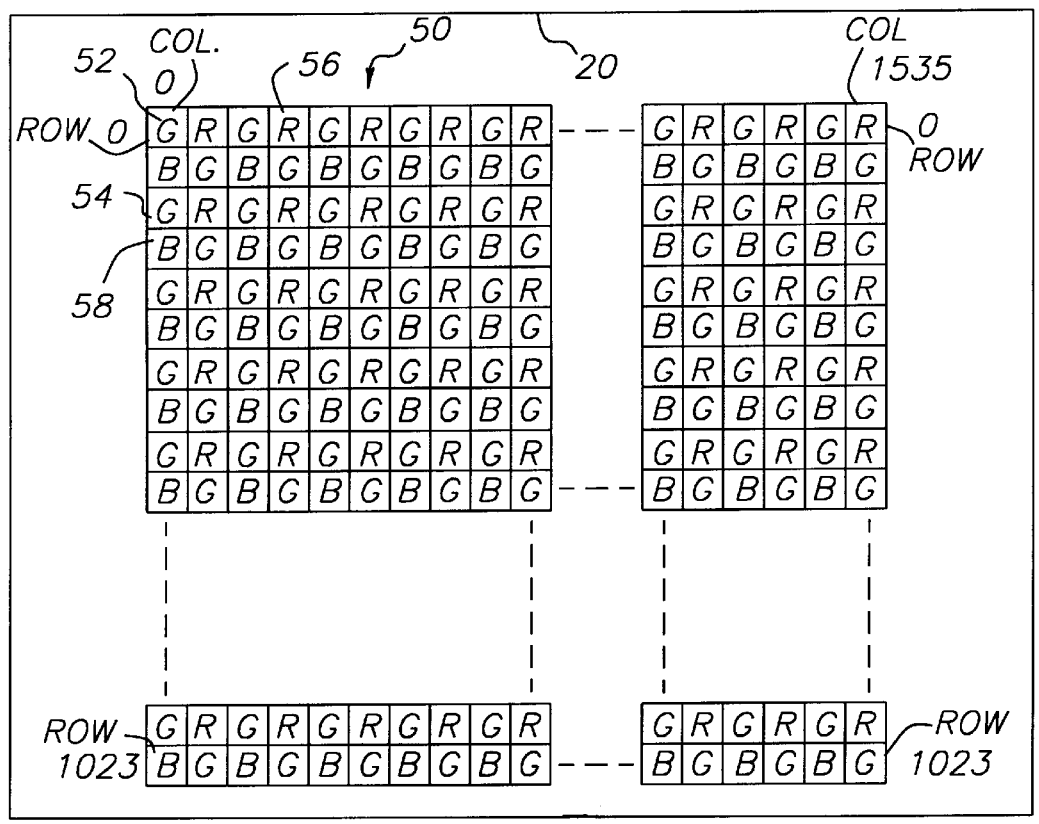
FIG. 2 is a diagrammatic view of a CFA color image sensor.

Sensor 20 is a CCD sensor having a color filter array over the CCD pixel sites. One color component is captured per pixel. Thus, interpolation is required to construct three full RGB color planes for the image. An exemplary color filter array pattern is shown in FIG. 2 for a 1023×1535 pixel active image area. The CFA consists of a regular 2×2 pixel array of kernels. Each kernel 50 consists of two green pixels 52,54 on one diagonal and a red pixel 56 and blue pixel 58 on the other diagonal.

According to the present invention, each monocolor pixel is corrected for spatial non-uniformity by corrector 36 which has separate correctors for each color R,G,B. The preferred correction algorithm will now be described.

We wish to correct for spatial non-uniformities encountered in a large-array sensor. We will study a possible implementation to correct for spatially correlated multiplicative non-uniformities which can be approximated by a quadratic function along each image axis. Let us represent these multiplicative non-uniformities by the following function:

$$f(x,y)=(a \cdot x^2+b \cdot x+c) \cdot (A \cdot y^2+B \cdot y+C)$$

However, as we expect that the surface features that we will be correcting for will be small, we can immediately simplify this relation by the binomial expansion as follows:

$$(1+\Delta x) \cdot (1+\Delta y)=1+\Delta x+\Delta y+\Delta x \cdot \Delta y \approx (1+\Delta x)+(1+\Delta y)-1 \text{ for small } \Delta x, \Delta y$$

Thus, we will now work with a simplified version of our original function in the following form:

$$f_{approx}(x,y)=(a \cdot x^2+b \cdot x+c)+(A \cdot y^2+B \cdot y+C)-1=(a \cdot x^2+b \cdot x)+(A \cdot y^2+B \cdot y)+(c+C-1)$$

This is separable with respect to the variables x and y as follows:

$$f_{approx}(x,y)=f_{approx\_x}(x)+f_{approx\_y}(y)+(c+C-1)$$

where:

$$f_{approx\_x}(X)=a \cdot x^2+b \cdot x$$

and:

$$f_{approx\_y}(y)=A \cdot y^2+B \cdot y$$

We can now differentiate with respect to x and y as follows:

$$\frac{\partial}{\partial x} f_{approx\_x}(x) = 2 \cdot a \cdot x + b$$

and:

$$\frac{\partial}{\partial y} f_{approx\_y}(y) = 2 \cdot A \cdot y + B$$

By differentiating once more with respect to x and y we obtain:

$$\frac{\partial^2}{\partial^2 y} f_{approx\_y}(y) = 2 \cdot A$$

We can thus reconstruct the original functions as follows:

$$f_{approx(x,y)} = f_{approx\_x}(x) + f_{approx\_y}(y) + (c + C - 1)$$

$$= \int_{x_{min}}^{x_{max}} \left[ \left( \int_{x_{min}}^{x_{max}} 2 \cdot a \cdot \partial x \right) + b \right] \partial x +$$

$$\int_{y_{min}}^{y_{max}} \left[ \left( \int_{y_{min}}^{y_{max}} 2 \cdot A \cdot \partial y \right) + B \right] \partial y + (c + C - 1)$$

We have now reduced the original function into a form which only involves the double-integration of constant terms. We thus have a form which can be implemented without any costly multiplications. What we will actually implement is a finite difference implementation of the above.

Let us now define a few variables which we will use in a pseudo-code version of the actual FPGA implementation.

quad$_{(x,y)}$=the value of the function evaluated at the current pixel location (x,y)

quad$_{(0,y)}$=the value of the function evaluated at the beginning of the current line (0,y)

quad$\Delta x_{(x+1,y)}$=the value of the first partial with respect to x taken at (x+1,y)

quad$\Delta y_{(0,y+1)}$=the value of the first partial with respect to y taken at (0,y+1)

Now that we have defined our terms, we can now construct our pseudo-code as follows:

```
quad(x,y)=c+C−1;
quad(0,y)=c+C−1;
quadΔy(0,y+1)=B;                          /*see note below*/
for (y=0; y<y__max: y++)
    {
    quadΔx(x+1,y)=b;                      /*see note below*/
    for (x=0; x<x__max; x++)
        {
        /*use quad(x,y) here on the current pixel at (x,y)*/
        quad(x,y)+=quadΔx(x+1,y);         /*outermost integral with respect to dx*/
        quadΔx(x+1,y)+=2·a;               /*innermost integral with respect to dx*/
        }
    quad(0,y)+=quadΔy(0,y+1);             /*outermost integral with respect to dy*/
    quad(x,y)=quad(0,y);
    quadΔy(0,y+1)+=2·A;                   /*innermost integral with respect to dy*/
    }
```

The previous integral simply equates to the Riemann sum of the functions. However, by employing the trapezoidal rule on the outermost integral, we can achieve an exact result. (The latter is because we are only dealing with quadratic functions. Therefore, its first derivative is a linear function. The outermost integral is the integral of this latter function, and as such, the integration via the trapezoidal rule results in an exact solution, not an approximate one.) This can be simply had by replacing the terms b and B, with b+a and B+A, respectively, in the statements marked above. We will also add two "if" statements to remove a few statements from executing unnecessarily on the last pixel of a line and on the last pixel of a frame. While this latter change is not too important in a software implementation, this has quite an impact on a hardware implementation, as we shall see later. With these changes, we obtain the following result:

```
quad(x,y) = c+C-1;
quad(0,y) = c+C-1;
quadΔy)0,y+1) = B+A;              /*trapezoidal rule invoked*/
for (y=0; y < y__max: y++)
    {
    quadΔx(x+1,y) = b+a;          /*trapezoidal rule invoked*/
    for (x=0; x<x__max; x++
        {
        /***use the quantity quad(x,y) here on the current pixel at
        (x,y)***/
        if (x<x__max-1)           /*these operations are not needed
                                    on the last pixel of a line*/
            {
            quad(x,y) +=quadΔx(x+1,y);  /*outermost integral with respect
                                          to dx*/
            quadΔx(x+1,y) += 2·a;       /*innermost integral with respect
                                          to dx*/
            }
        }
    if(y<y__max-1)                /*of course, these are not needed
                                    on the last pixel of the frame */
        {
        quad(0,y) += quadpΔy(0,y+1);  /*outermost integral with respect
                                        to dy*/
        quad(x,y) = quad(0,y);
        quadΔy(0,y+1) += 2·A;         /*innermost integral with respect
                                        to dy*/
        }
    }
```

The above is now in a form which can be implemented in a pipelined fashion using only additions in an corrector FPGA corrector. Note that all multiplications (such as 2·a) and additions (such as c+C-1) on the right side of the equations are constants which are known ahead of time. Thus, they can be all precalculated and fed to the circuit as part of its normal configuration. Furthermore, only two additions are needed for each value of quad(x,y) generated. (More additions would have been implied by the pseudo-code if it were not for the "if" statements.) By replacing the variables with registers, we can implement this function directly. Furthermore, by making the registers addressable, we can implement multiple quadratic surfaces that share the same corrector, as well as the final multiplier which is used to apply the actual correction. This shared use can be done so long as the results of only one quadratic surface is needed at any one time, as is the case in our application.

Figure 3A:
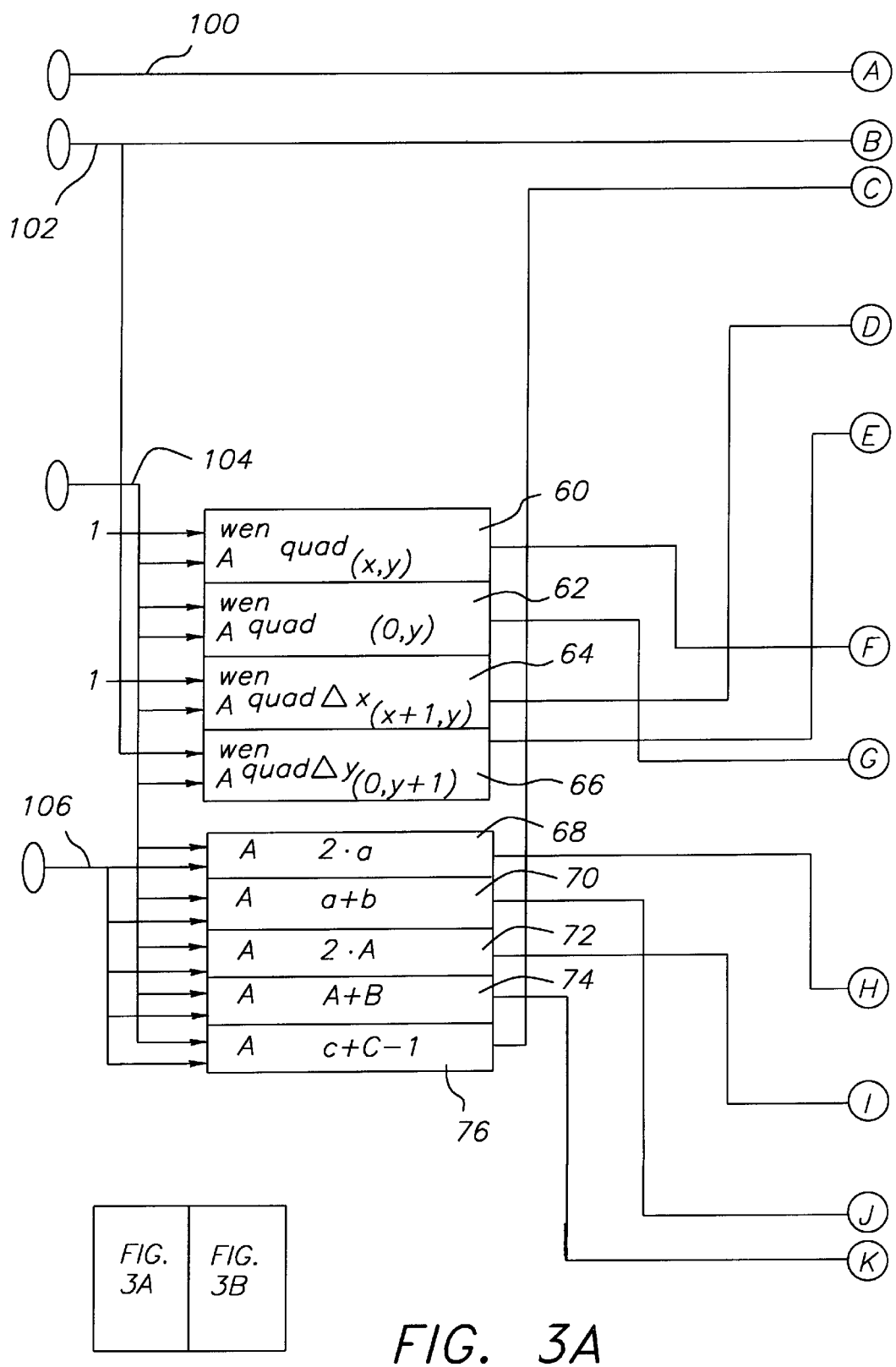
FIG. 3 is a conceptual block diagram of an implementation of the present invention.
Figure 3B:
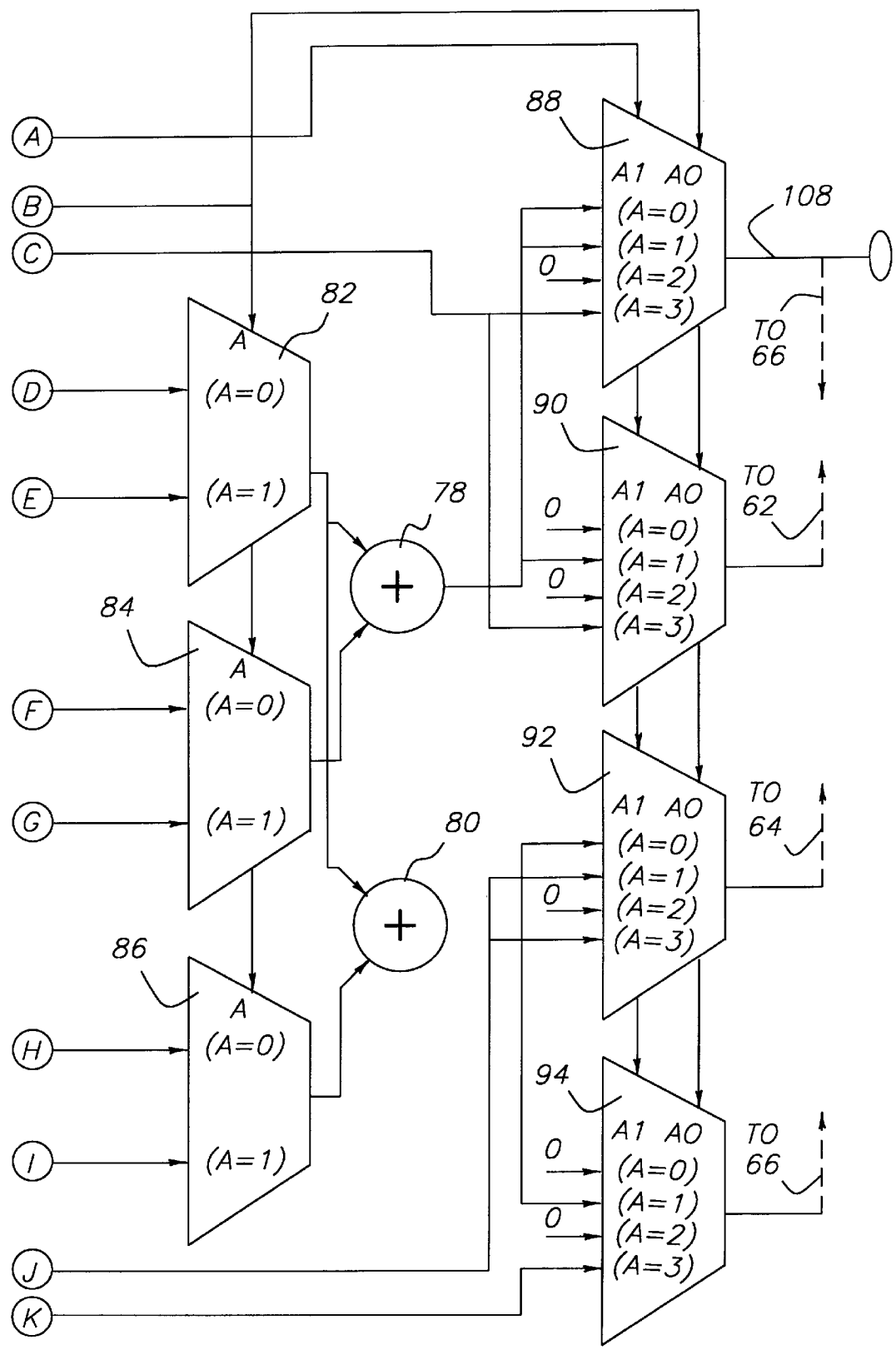

The block diagram of FIG. 3 shows how the algorithm was implemented for each color RGB into a single FPGA corrector 36. As shown, corrector 36 includes addressable scratchpad registers 60,62,64,66, addressable coefficient registers 68,70,72,74,76 adders 78,80, multiplexers 82,84, 86,88,90,92,94. The inputs and outputs to the corrector are marked with ellipses in the drawing. The inputs consists of two 1-bit inputs, one input 100 marks the first pixels of a frame for the current color component, and the other input 102 which marks the first pixel of the line for the current color component. The current color component being accessed is indicated by the input 104 referred to as "current color component index". For example, for the three color components of R, G, and B, this may be implemented as a 2-bit input. The fourth input is the configuration interface 106, which is used to upload the five parameters for each of the color component profiles to be generated on output 108. Finally, output 108 outputs the value of the quadratic surface for the current pixel. Inputs 100,102 are generated by timing generator 42, input 104 is coupled to frame store 34 and input 106 is coupled to CPU 40.

Figure 4:
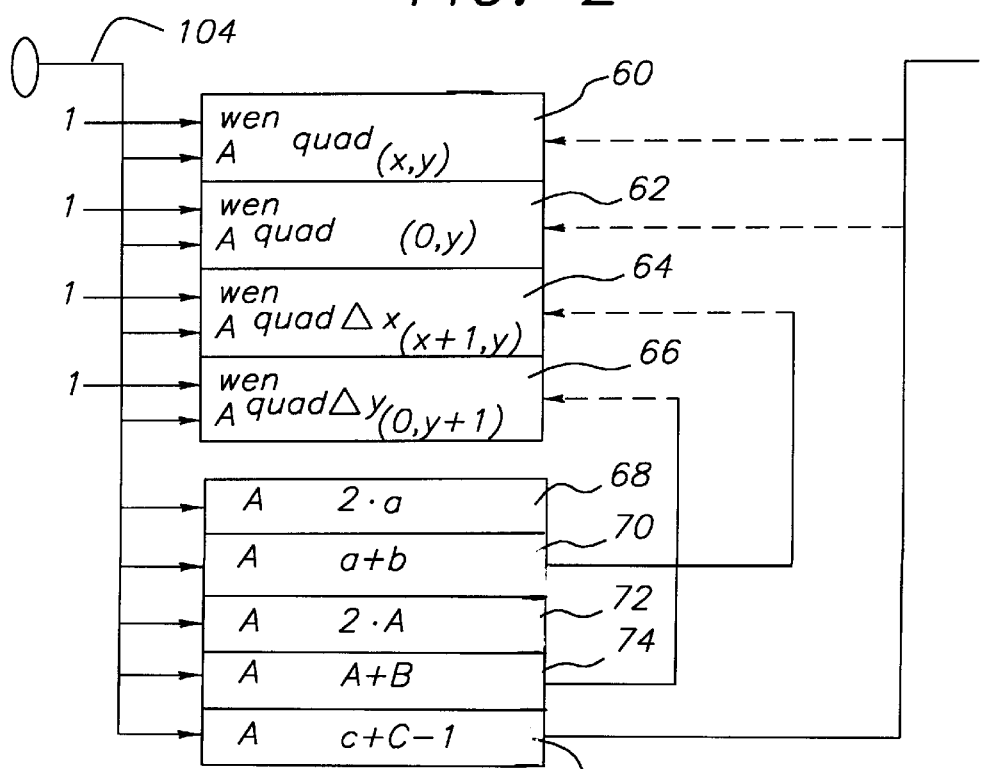
FIGS. 4–6 are degenerative block diagrams of FIG. 3 useful in explaining the present invention.
Figure 5:
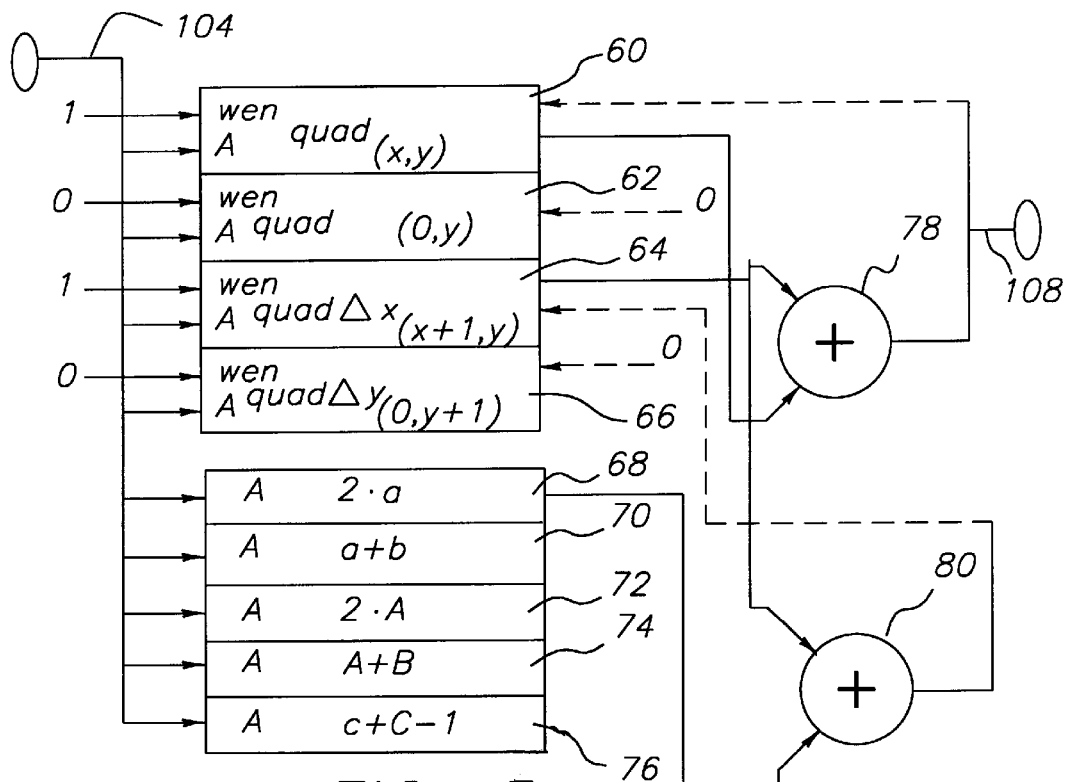
Figure 6:
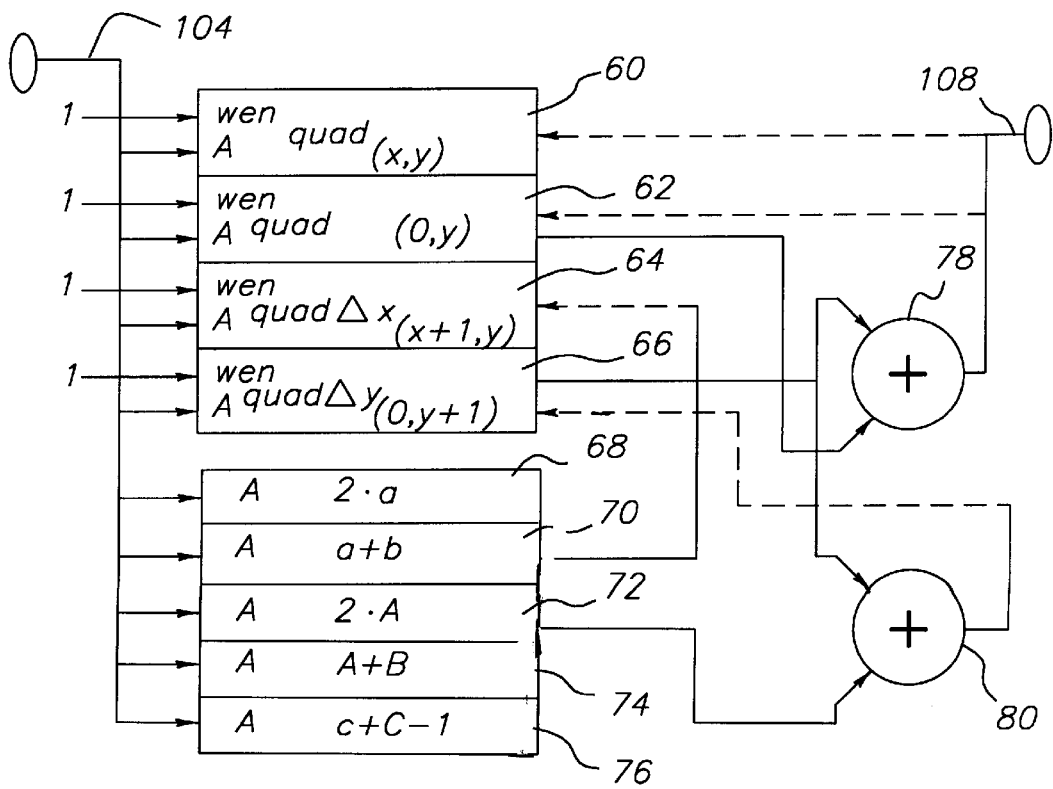

To demonstrate that FIG. 3 faithfully implements the pseudo-code described above, we will create three degenerated versions of FIG. 3 (there are three legal combinations to the inputs "first pixel of frame for current color" and "first pixel of line for current color".) FIGS. 4–6 will demonstrate the conditions of:

1. (FIG. 4). The first pixel of a frame, indicated by "first pixel of frame for current color"=1 and "first pixel of line for current color"=1.
2. (FIG. 5). All pixels other than the first of the line, indicated by "first pixel of frame for current color"=0 and "first pixel of line for current color"=0.
3. (FIG. 6). The first pixel of a line other than the first line, indicated by "first pixel of frame for current color"=0 and "first pixel of line for current color"=1.

In other words, if we take these two inputs as an ordered pair of ("first pixel of frame for current color", "first pixel of line for current color"), then the legal values are: (00b), (01b), or (11b), or in decimal, (0),(1), or (3).

These degenerated diagrams FIGS. 4–6 will now be described. (For clarity, the configuration interface 106 has been removed, as this interface is not intended for use in the middle of the profile generation operation.)

In this first mode shown in FIG. 4, we simply initialize all of the scratchpad registers 60–66, as well as output the very first value of the surface profile. FIG. 4 shows this by demonstrating that all of the scratchpad registers (60–66) write enable controls (wen) are enabled. Thus, we can see that quad$_{(x,y)}$ and quad$_{(0,y)}$ is properly initialized to c+C-1, quadΔx$_{(x+1,y)}$ to a+b, and quadΔy$_{(0,y+1)}$ to A+B. Furthermore, the initial value of quad$_{(x,y)}$ is c+C-1. This takes us through the first four assignment statements found in the pseudo-code, which is all that is needed for the first pixel of the frame.

The mode shown in FIG. 5 takes us through the execution of the innermost "for" loop in the pseudo-code. We see that in this mode, only the terms quad$_{(x,y)}$ and quadΔx$_{(x+1,y)}$ are enabled for update via their respective write enable (wen) controls. We can further see that both of these quantities are being incremented by the quantities quadΔx$_{(x+1,y)}$ and 2·a, respectively, thus implementing the innermost "for" loop.

Referring to FIG. 6, we now finally see the implementation for the pseudo-code following the end of the innermost "for" loop to the beginning of the innermost "for" loop. This part of the code addresses the operations involved in generating the first pixel of each line other than the first pixel of the frame. We see from FIG. 6 that all of the register 60–66 are enabled for updates via their respective "wen" inputs, allowing the following register updates to occur:

1. Both quad$_{(x,y)}$ register 60 and quad$_{(0,y)}$ register 62 are initialized to (quad$_{(0,y)}$+quadΔy$_{(0,y+1)}$).
2. quadΔx$_{(x+1,y)}$ register 64 is updated with the quantity (a+b).
3. quadΔy$_{(0,y+1)}$ register 66 is incremented by 2·A.

We can now see how the circuit described implements the desired algorithm of the invention.

The invention has been described in detail with particular reference to certain preferred embodiments thereof, but it will be understood that variations and modifications can be effected within the spirit and scope of the invention.

| PARTS LIST | |
|---|---|
| 12 | color video camera |
| 14 | color image processor |
| 16 | color image display |
| 18 | lens |
| 20 | color image sensor |
| 22 | correlated double sampling circuit |
| 24 | analog-to-digital converter |
| 26 | high speed serial link driver |
| 28 | central processing unit |
| 30 | memory |
| 32 | high speed serial link driver |
| 34 | frame store |
| 36 | non-uniformity corrector |
| 38 | color interpolator |
| 40 | CPU |
| 42 | timing generator |
| 44 | digital-to-analog converter |
| 46 | serial link |
| 50 | kernel |
| 52, 54 | green pixels |
| 56 | red pixel |
| 58 | blue pixel |
| 60, 62, 64, 66 | addressable scratchpad registers |
| 68, 70, 72, 74, 76 | addressable coefficient registers |
| 78, 80 | adders |
| 82, 84, 86, 88, 90, 92, 94 | multiplexers |
| 100, 102, 104 | inputs |
| 106 | configuration interface |
| 108 | output |

```
quad(x,y) = c+C−1;
quad(0,y) = c+C−1;
quadΔy(0,y+1) = B+A;           /*trapezoidal rule invoked*/
for (y=0; y < y_max: y++)
{
    quadΔx(x+1,y) = b+a;        /*trapezoidal rule invoked*/
    for (x=0; x<x_max; x++
    {
        /***use the quantity quad(x,y) here on the current pixel at
        (x,y)***/
        if (x<x_max−1)          /*these operations are not needed
                                 on the last pixel of a line*/
        {
            quad(x,y) +=quadΔx(x+1,y);  /*outermost integral with respect
                                         to dx*/
            quadΔx(x+1,y) += 2·a;       /*innermost integral with respect
                                         to dx*/
        }
    }
    if(y<y_max−1)               /*of course, these are not needed
                                 on the last pixel of the frame */
    {
        quad(0,y) += quadpΔy(0,y+1);  /*outermost integral with respect
                                       to dy*/
        quad(x,y) = quad(0,y);
        quadΔy(0,y+1) += 2·A;         /*innermost integral with respect
                                       to dy*/
    }
}
```

What is claimed is:

1. A color imaging system comprising:

a color image sensor having a matrix of photosites and a color filter array masking said matrix of photosites such that each photosite captures one color of first, second, and third colors, said color filter array constituting a repetitive pattern of said first, second, and third colors; said sensor producing a color image signal including a matrix of monocolor pixels corresponding to said color filter array pattern;

a memory associated with said sensor for storing spatial non-uniformity correction coefficients for each of said first, second, and third colors;

a field programmable gate array which is programmed as a spatial non-uniformity color corrector for correcting said monocolor pixels of said color image signal, said gate array being programmed according to the following pseudo-code:

where $quad_{(x,y)}$=the value of the function evaluated at the current pixel location (x,y)

$quad_{(0,y)}$=the value of the function evaluated at the beginning of the current line (0,y)

$quadΔx_{(x+1,y)}$=the value of the first partial with respect to x taken at (x+1,y)

$quadΔy_{(0,y+1)}$=the value of the first partial with respect to y taken at (0,y+1) to produce corrected monocolor pixels;

a timing generator for supplying timing signals to said gate array; and a computer processing unit for providing said correction coefficients from memory to said gate array.

* * * * *